United States Patent [19]

Uhlig

[11] 4,024,975

[45] May 24, 1977

[54] REINFORCED BOTTLE

[75] Inventor: Albert R. Uhlig, Toledo, Ohio

[73] Assignee: Owens-Illinois, Inc., Toledo, Ohio

[22] Filed: Jan. 2, 1976

[21] Appl. No.: 646,225

Related U.S. Application Data

[62] Division of Ser. No. 505,966, Sept. 16, 1974, Pat. No. 3,956,441.

[52] U.S. Cl. .............................................. 215/1 C
[51] Int. Cl.² .......................................... B65D 1/02
[58] Field of Search ........................ 215/1 C; 220/72

[56] References Cited

UNITED STATES PATENTS

| | | | |
|---|---|---|---|
| 3,029,963 | 4/1962 | Evers | 215/1 C |
| 3,114,932 | 12/1963 | Donnelly | 215/1 C X |
| 3,137,748 | 6/1964 | Makowski | 215/1 C X |
| 3,536,500 | 10/1970 | Cleereman | 215/1 C X |
| 3,944,124 | 3/1976 | Hexel | 220/72 X |

FOREIGN PATENTS OR APPLICATIONS 1,214,626  11/1959  France .................................. 220/72

*Primary Examiner*—Donald F. Norton
*Attorney, Agent, or Firm*—Richard D. Heberling; E. J. Holler

[57] ABSTRACT

Plastic containers having internal reinforcing ribs are formed by a molding operation including pre-blow and final-blow steps. The pre-blow step includes inflating a blowable plastic parison into contact with the cavity walls of a first blow mold to form a blown pre-form, the cavity walls of the first blow mold including a plurality of concave grooves to form a pattern of convex or protuberant ribs on the outer-periphery of the pre-form. The final-blow step includes positioning the blown, ribbed pre-form within a second or final blow mold having a cavity defined by substantially smooth wall surfaces conforming to the exterior configuration of the desired container. Next, the pre-form is blown to stretch and expand against the cavity walls of the second mold, during which step the convex ribs on the exterior of the pre-form are flattened, forming concave portions intermediate convex reinforcing ribs on the internal wall surface of the container.

6 Claims, 15 Drawing Figures

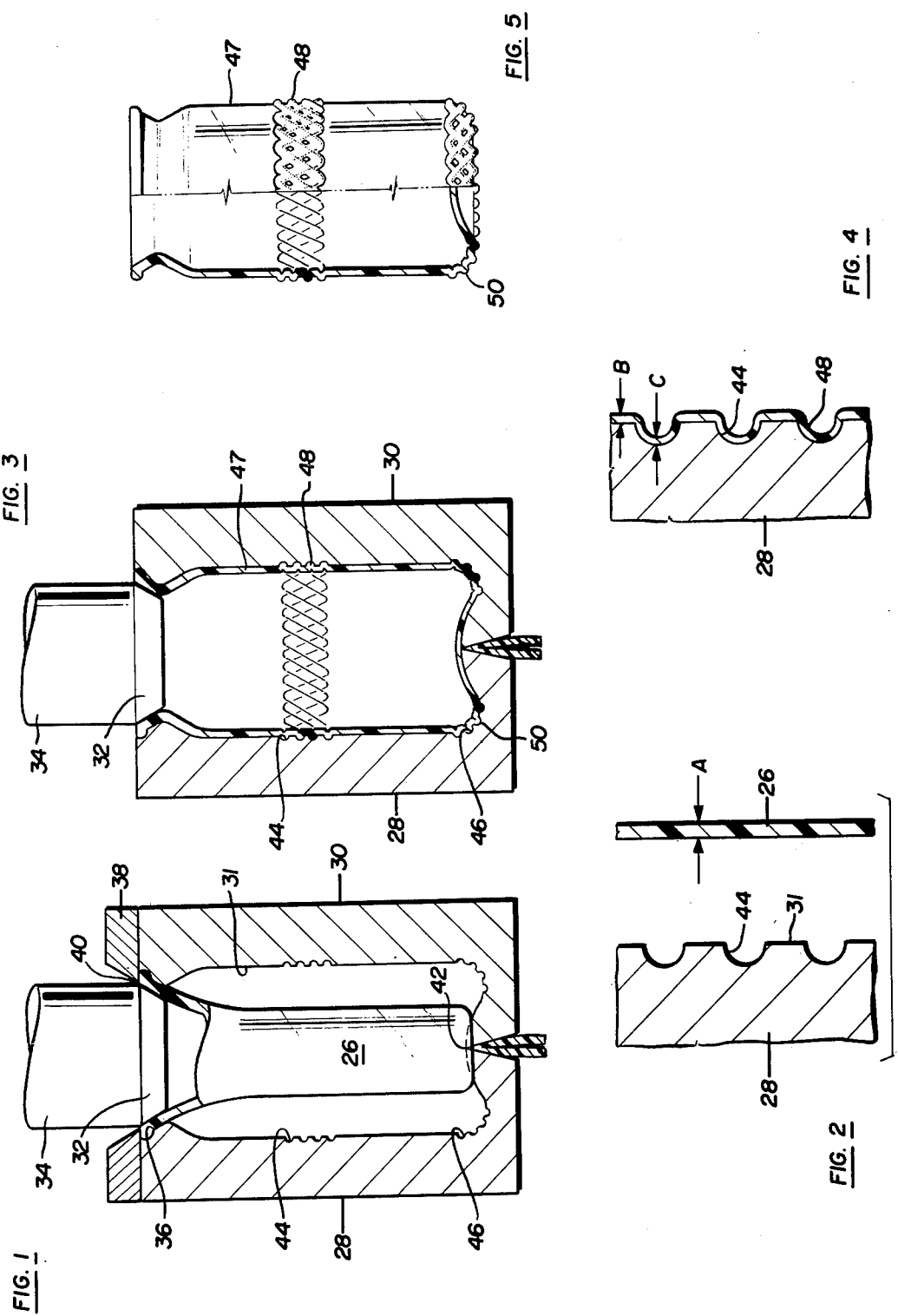

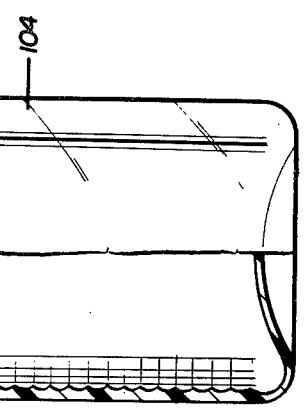
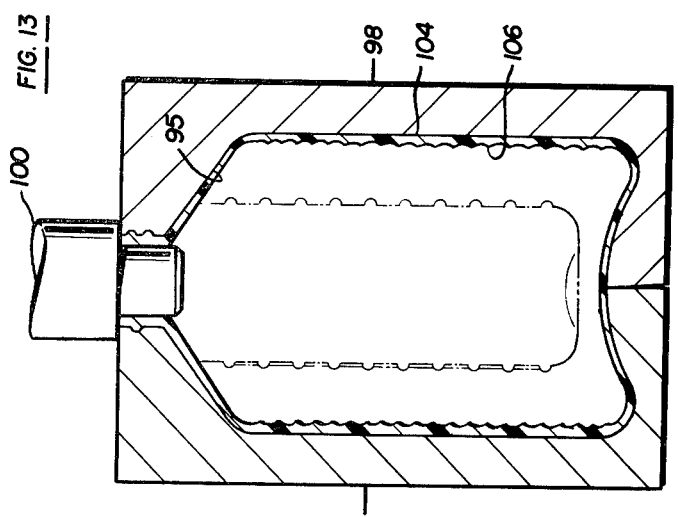
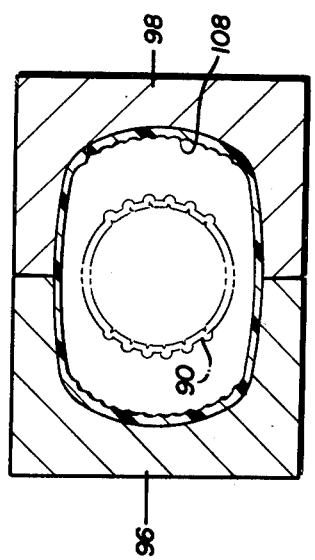
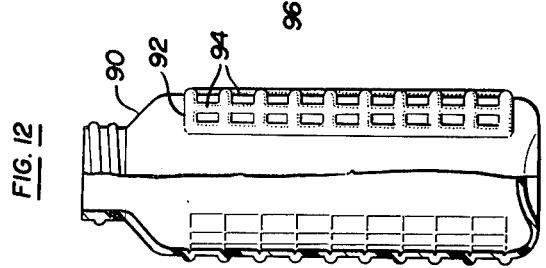
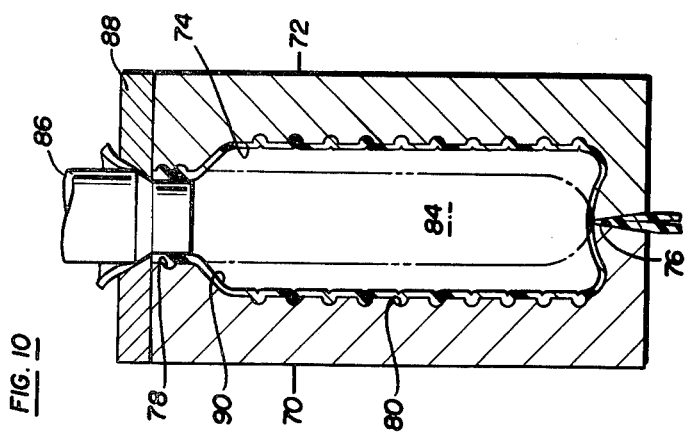
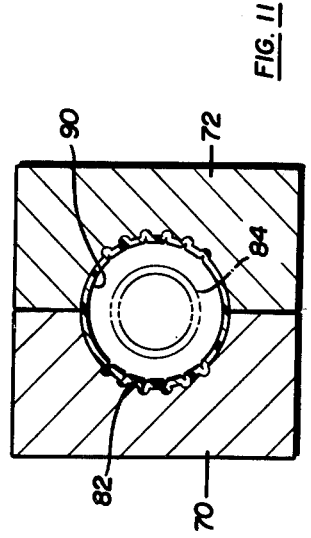

REINFORCED BOTTLE

RELATION TO PRIOR APPLICATION

This application is a division of U.S. Pat. Application Serial No. 505,966, filed Sept. 16, 1974, now U.S. Pat. No. 3,956,441.

BACKGROUND OF THE INVENTION

1. Field of the Invention

The present invention relates to a blown plastic article having internal reinforcing ribs and to the method of forming such an article. More specifically, the method of forming the article includes blowing a plastic parison into an blown pre-form having a pattern of exterior, outwardly projecting ribs; the pre-form is then finally blown into the shape of the container whereby the outwardly directed rib pattern is converted into a pattern of internal reinforcing ribs.

2. The Prior Art

In order to save material, plastic bottles which do not require great strength characteristics have been formed with thin wall thicknesses, such as in bottles for half-pint drink cartons. Many of these bottles, however, require reinforcement in the form of externally projecting ribs to compensate for the reduction in wall thickness. Because these grooves are positioned on the outer portion of the bottle, they must be arranged to appear as a decorative effect to aesthetically please the consumer. Accordingly, the external ribs are generally arranged around the entire circumference of the bottle and sometimes along the entire length of the bottle. Such an arrangement results in two primary disadvantages. First, labeling or decorative space is limited or interfered with by the protruding external grooves; and second, greater amounts of material are required to form the ribs to accomplish the decorative effect. The present invention overcomes these disadvantages by the method of providing a bottle having internal reinforcing ribbing (a) which does not interfere with other decoration of bottle, (b) which can be discontinuous so that the bottle can be strengthened only where necessary or desired, and (c) which therefore provide for a material savings.

It is known in the prior art to extrude a tubular plastic parison having external reinforcing ribs which are reversed during the blow molding process to provide internal reinforcement to the blown bottle, as disclosed in U.S. Pat. No. 3,114,932 to Donnelly. It is also known in the prior art to injection mold a plastic parison having a localized thickened region which reinforces the heel of a blown bottle, as disclosed in U.S. Pat. No. 3,137,748 to Makowsky. A primary drawback in the method disclosed by U.S. Pat. No. 3,114,932 is the inability to form circumferential grooves in the plastic parison which are destined to become circumferential reinforcing ribs on the container, without providing a variable extrusion die which is costly because of the required machining, tooling and multiplicity of die parts.

Another problem which can be expected to be experienced in the utilization of the method and apparatus disclosed by the two aforementioned patents is the precise location of the reinforcing portion of the parison at the desired location in the blow molding cavity. During the blow molding procedure of a parison, the plastic material can not be expected to expand uniformly due to localized weaknesses that may appear in the parison itself. As a result, portions of the parison may tend to expand more quickly than other portions of the parison, much like a weakened portion on a inflatable rubber tube. Any such "parison wander" would defeat the objectives of the Makowsky patent and would diminish the desireability of a bottle produced by the process of the Donnelly patent. The present invention further overcomes these problems in the prior art by utilizing a blow molding procedure utilizing a pre-blow and a final-blow, which not only results in a stronger bottle because of molecular orientation, but also affords more precise positioning of any reinforcing ribs due to the relatively small blow-up between the pre-blow station and the final-blow station. The many advantages which accrue from molecular bi-axial stretch orientation are generally known in the art and therefore will not be reiterated here, but reference for such advantages may be made to U.S. Pat. No. 3,767,747, which is incorporated by reference.

Accordingly, the present invention overcomes the disadvantages in prior art bottles having external reinforcing ribbing by providing a bottle which is strengthened by molecular orientation and by internal ribbing. Further, the internal reinforcement ribbing proposed by the present invention may be accurately located through the utilization of a pre-blow and final-blow molding procedure, which necessarily reduces the "blow-up" or expansion of the plastic material after the reinforcing ribs have been formed.

SUMMARY OF THE INVENTION

The present invention relates, first, to a bottle having internal reinforcing ribbing, and second, to a method of forming such a container.

The method of forming the container for the present invention includes positioning a tubular plastic parison, made by either free extrusion or injection molding techniques, within a set of pre-blow mold halves, which include a pattern of concave grooves at portions of the cavity walls. Blowing air is then introduced into the blowable plastic parison to expand the plastic material radially outwardly into contact with the cavity walls. The plastic material which contacts the cavity walls where the concave grooves exist is forced into such grooves to form outwardly projecting bulbous ribs on the intermediate, or pre-blown, article formed during the blowing procedure. Since the material which is expanded into the groove is inflated to a greater extent, the bulbous ribs are necessarily of a dimenished thickness.

The blown pre-form is then transferred to and enclosed within a final blow mold having interior walls defining a cavity conforming to the shape of the final article, which by design will have smooth, non-ribbed exterior wallsurfaces. Final blowing air is then injected into the blown pre-form to expand the plastic material radially outwardly into contact with the cavity walls of the final blow mold. During the final blowing procedure, the previously formed bulbous ribs on the pre-form provide a resistance to expansion so that the non-ribbed portions are expanded to a greater degree than the ribbed portion. As a result, that portion of the final container which is formed from the ribbed portion of the pre-form will have a greater thickness due to the material reinforcement and the diminished expansion.

During the final blowing process, the externally projecting ribs are stretched and thereby flattened to a certain extent in an accordion-like fashion. When this region of the plastic material contacts the walls of the final blow mold cavity, it is pressed by the blow air pressure to form a smooth outer wall on the final article or container. As the outwardly projecting, convex bulbous ribs are pressed against the final blow cavity walls, localized accumulations of material are formed on the interior of the container walls as the positions corresponding to the location of the heels or elbows of the previously existing grooves. The internal accumulations of material define a network of "ribs" to locally reinforce the container in desired locations.

Due to the resistance of the ribbed portion of the pre-form to expansion during the final blowing process, a differential expansion occurs, thereby resulting in a container having thicker wall portions in the region between the internal reinforced rib as compared to the remainder of the container which was formed from previously existing non-ribbed regions on the pre-form. Thus, the container includes not only a structural reinforcement due to the internal rib, but also includes a material reinforcement.

The multiple advantages of the process of the present invention will be readily appreciated. First, the final article includes both material and structural reinforcement to enable the production of a bottle having comparatively thin walls in low stress regions. Second, the ribbing reinforcement for the container is located on the inside of the article so that it may be positioned in localized areas of weakness such as in the heel of a bottle without being continuous or decoratively arranged. Third, the disclosed method includes pre-blowing and final-blowing to provide a molecularly oriented container having enhanced strength characteristics. Fourth, the disclosed method enables precise location of the material and structural reinforcement in desired regions of the final container. Other advantages and meritorious features of the present invention will become apparent for the further detailed description of the invention which follows.

BRIEF DESCRIPTION OF THE DRAWINGS

FIG. 1 is a vertical sectional view of an initial step of the present invention illustrating a blowable tubular parison confined in a pre-form mold having grooves along its cavity walls.

FIG. 2 is an enlarged, fragmentary view of the tubular parison and the grooved region of the pre-form mold.

FIG. 3 is a view similar to FIG. 1 illustrating the formation of an intermediate of pre-form article.

FIG. 4 is an enlarged, fragmentary view illustrating the expanded parison in the region of the grooved cavity walls, wherein outwardly projecting bulbous ribs are formed on the pre-form.

FIG. 5 is a partial sectional view of the pre-form article.

FIG. 10 is a vertical sectional view through a pre-form blow mold similar to that of FIG. 1, but illustrating the formation of a pre-form for a different form of container.

FIG. 11 is a horizontal section view of the pre-form mold in accordance with FIG. 10.

FIG. 12 is a partial vertical sectional view of the pre-form manufactured by the mold of FIG. 10.

FIG. 13 is a vertical sectional view similar to FIG. 6, but illustrating a final blow mold for use in conjunction with the pre-form mold of FIG. 10.

FIG. 14 is a horizontal sectional view of the blow mold of FIG. 13.

FIG. 15 is a partial sectional view of a container produced by the molds of FIGS. 10–14.

DETAILED DESCRIPTION OF THE INVENTION

Figure 8:
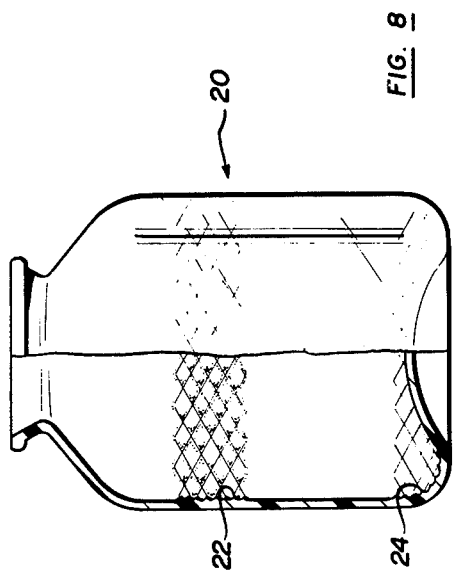
FIG. 8 is a partial vertical sectional view of the final container having internal reinforcing structure.
Figure 6:
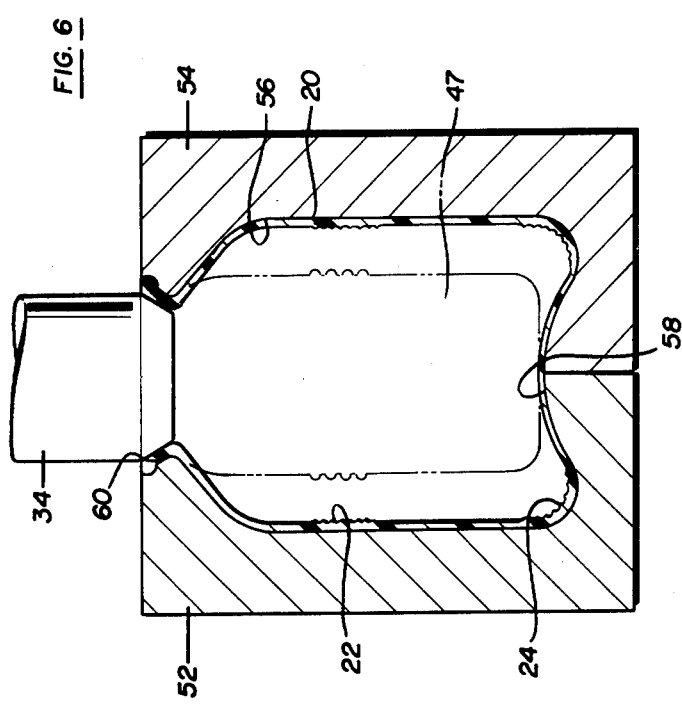
FIG. 6 is a vertical sectional view through a final blow mold of the present invention, illustrating the final blowing process of the plastic material.

The overall method proposed by the present invention relates to the formation of a container or bottle having internal reinforcing ribs as illustrated in FIG. 8, wherein a bottle 20 is shown as having two regions 22 and 24 of reinforcing ribbing. More specifically, the method of forming bottle 20 includes, first, positioning a tubular plastic pre-form within a set of pre-blow molds having arcuate grooves on its internal cavity walls. Then, pressurized air is injected into the tubular parison to expand the plastic material radially outwardly against the pre-blow mold walls to form an intermediate article or blow pre-form. The arcuate grooves on the pre-blow mold walls form outwardly directed bulbous projections on the intermediate article which is then transferred to a final blow mold cavity. Once properly positioned within the final blow mold, the pre-form is inflated outwardly into contact with the final cavity walls by external pressurized blow air. The outwardly directed bulbous projections (or convex ribs) on the intermediate article are flattened to form a smooth outer surface on the final container, while controlled excesses of material form the internal ribbing for the bottle as illustrated by reference numerals 22 and 24 in FIG. 8.

Referring now to FIGS. 1–4, reference numeral 26 refers generally to a plastic parison which can be of the freely extruded tubular type or injection molded type. As illustrated, the plastic parison 26 is positioned within a mold cavity 31 formed by a pair of pre-blow mold halves 28 and 30 which may or may not be identical. The mold halves 28 and 30 are opened and closed by conventional means, such as hydraulic rams or the like. The upper end of the parison is compressed between a tapered calibrating section 32 of a blow pipe 34 and a neck forming section 36 of the blow mold halves, which includes a bulb shape groove to form a lip on the container. Flash (now shown) may be severed from the upper portion of a parison by a pair of parison neck trimmers 38, or the like, having shearing edges 40. The lower end of the parison 26 is pinched shut by pinching projections 42 on the blow mold halves to form a waste flash as is common in the art with freely extruded tubular type parisons.

Arcuate-like grooves 44 and 46 are formed in the side walls of cavity 31 to form the outwardly projecting bulbous ribs as briefly discussed above. These grooves may be continuously formed around the circumference of the cavity wall or they may be locally positioned to form outwardly projecting ribs on the intermediate article which are destined to become internal reinforcing ribs on the final container. In fact, such grooves should be positioned in any region that would correspond with a localized weakened regions in the final container. FIG. 2 more clearly illustrates the wall of parison 26 as it is positioned adjacent the grooves 44 in the side wall of parison 26 as it is positioned adjacent the grooves 44 in the side wall of cavity 31 before inflation air is introduced into the parison for expansion. It can also be seen from FIG. 2 that the parison 26 has a thickness designated as A prior to formation of the pre-form or intermediate article.

As illustrated in FIG. 3 the parison has been inflated radially outwardly into contact with the walls of mold cavity 31 according to standard blowing techniques, for example by introducing blowing air through blow pipe 34. As a result of such blow molding technique an intermediate or pre-blown article 47 is formed having outwardly directed, bulb-shaped projections 48 and 50, as best illustrated in FIG. 4. Due to the expansion of the parison, the pre-form will have a thickness in the non-ribbed regions as designated in FIG. 4 by B which is less than thickness A. The outwardly projecting bulbous ribs 48 and 50 will have a thickness as designated by C in FIG. 4, with thickness C being less than thickness B due to the additional expansion experienced by the outwardly directed ribs.

Referring now to FIG. 5, it will be seen that the pre-form or intermediate article 47 includes a plurality of sinuous, outwardly directed ribs 48 and 50, which are destined to form the internal reinforcing ribs on the final container 20. Any configuration may be chosen for the bulbous projections as formed by the grooves 44 and 46 in the mold cavity 31; for example the bulbous ribs may be truly annular around the circumference of the pre-form, they may be in the shape of a plurality of mound-shaped projections, or they may be sinuous-shaped as illustrated in FIG. 5. The particular shape and position of the ribs will be chosen on the basis of the desired reinforcement structure on the final container.

Next, the blown pre-form 47 is transferred to a final mold cavity 56 which is formed by mold halves 52 and 54. The actual transfer of the pre-form 47 may take place, for example, by moving blow pipe 34 to the position of the final blow molds or by moving the blow molds to the position of the blow pipe. As a further example, the blown pre-form 47 may be transfered to the final blow molds by an independent transfer means, with a separate or different blow pipe being utilized for the inflation and expansion step. As illustrated, the blown pre-form has been transfered to the final blowing station by blow pipe 34 which was utilized during the pre-blowing procedure.

The cavity 56 will be formed from smooth walls, at least in the region of the outwardly projecting ribbed portion on the blown pre-form in order to form a final container 20 having a smooth outer surface. Further, the cavity 56, as illustrated, includes a contoured bottom portion 58 to form a concaved container bottom for strength. The blow mold halves 52 and 54 also define a neck section 60 conforming to the shape and size of the corresponding portion on the pre-blow mold such that the neck region of the pre-form does not experience any further forming. After the pre-form has been properly positioned within mold cavity 56, blowing air is injected through the blow pipe 34 to finally blow the plastic material into its final shape. The advantages of pre-blowing and final blowing to achieve molecular orientation for enhancing the physical characteristics of an article are generally known in the art and are moe fully discussed in U.S. Pat. No. 3,767,747, which is incorporated herein by reference.

Figure 7:
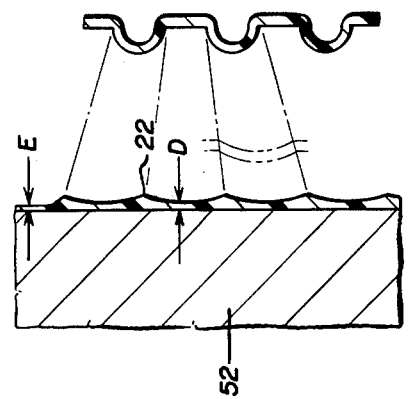
FIG. 7 is an enlarged fragmented view, illustrating the expansion of the ribbed portion of the pre-form and the formation of the internal reinforcing ribbing on the final container.

During the final blowing step the plastic material of the pre-form expands radially outwardly toward the walls of cavity 56. The previously formed outwardly projecting ribs 48 act as a structural reinforcement during the inflation and expansion step and therefore resist or inhibit stretching. As a result, a differential stretching takes place between the ribbed and non-ribbed sections of the pre-form, resulting in the ribbed portion reachin the final blow mold walls with less stretching thus providing a thicker region for structural and material reinforcement. Further, the ribs end to be "flattened" in an accordion-like manner to become less convex during the final blowing step, as illustrated in phantom in FIG. 7. Therefore, due to the differential expansion, the portion of the final container 20 which is formed from the non-ribbed segment of the pre-form will have a thickness designated by E in FIG. 7, whereas the wall thickness of the other portion of the container will be that as designated by D, wherein D is greater or thicker than E. As illustrated, the internal reinforcing ribs have greater thickness than that of the region having a thickness D.

Figure 9:
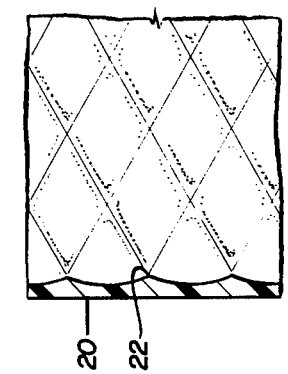
FIG. 9 is an enlarged fragmentary view of the side wall of the article in the region of the internal reinforcing ribbing.

As the ribbed-portion of the plastic pre-form is expanded into contact with the walls of cavity 56, the outer extremity of any then existing projections will engage the mold surface and be rigidified, with the remaining arcuate portions of te ribs "laying up" progressively on the mold wall. Once the material is completely inflated into contact with the mold wall surfaces, a ribbing structure is formed on the interior of the final container at the location corresponding to the elbow or heel region at the intersection of one individual outwardly projecting groove and the adjacent longitudinal non-grooved pre-form material. The internal ribbing which is formed is actually a controlled accumulation of excess material for strenthening the container. From FIGS. 7 and 9 it can be seen that the internal reinforcing structure 22 has a thickness greater than D and that two ribs 22 are formed from each bulbous projection. The resulting internal ribbed wall structure therefore provides (1) a material-reinforcement from the additional plastic material forming the ribs and the container wall between the ribs, and (2) a structural reinforcement in the form of the internal ribs.

FIG. 8 illustrates the final container 20 having the internal reinforcing ribbing structure 22 and 24 as previously discussed. The advantages which follow from the present invention have been more fully discussed in the Summary of the Invention. However as a brief review those advantages include, among others, (1) the ability to accurately position the reinforcing structure in the desired regions of the final container, (2) the ability to form a container having smooth external surfaces yet also having ribbed reinforcing structure and (3) the ability to use less material in forming a finished product.

Referring now to FIGS. 10-15, a different form of the present invention is illustrated, with the primary steps of forming a finished bottle being essentially the same as that of FIGS. 1-9.

Specifically, FIG. 10 illustrates a mold cavity 74 defined by a pair of mold halves 70 and 72, which as discussed previously may or may not be identical. Molds 70 and 72 also include pinching projections 76 which are similar to the corresponding structure of the mold illustrated in FIGS. 1 and 3. Unlike the previous embodiment, molds 70 and 72 define a neck region 78 which includes threads for a threaded neck portion of a final container, as is common in the art. Further, the present embodiment includes two sets of circumferential grooves 80 which extend around less than the entire circumference of the mold cavity and also two sets of longitudinal grooves 82, as best illustrated in FIG. 11, which extend substantially the length of the primary portion of the cavity.

In this embodiment, a parison 84 is positione on a blow pipe 86 between the pair of mold halves 70 and 72. Upon closure of the mold halves, the bottom portion of the parison is pinched shut and the top portion of the parison is calibrated to form the container neck and finish. Flash may also be severed from the upper portion of the parison by trimmers 88.

Next, air is introduced through blow pipe 86 to inflate the parison to the shape of the mold cavity 74 which corresponds to the shape of the pre-form article illustrated in FIG. 12. The blowing procedure is identical to that described in connection with the embodiment with the embodiment of FIGS. 1 and 3, wherein the pre-form or intermediate article 90 is formed with outwardly directed, bulb shaped circumferential grooves 92 and similar longitudinal grooves 94.

Next, the pre-form 90 is position within a final mold cavity 95 which is defined by a pair of mold halves 96 and 98. As illustrated in FIG. 13 a separate or different blow pipe 100 is used in this embodiment as distinguished from the description and disclosure relating to the process of the first embodiment. Air is then introduced through blow pipe 100 to inflate the pre-form 90 to the shape of the cavity 95 which corresponds to the shape of the final article 104.

The differential expansion between the ribbed and non-ribbed portions of the pre-form 90 to the shape of the final container are similar to the description of embodiment 1 and therefore need not be repeated here. Likewise, the manner in which the internal ribbing for the present embodiment is formed is similar to the previous discussion. The primary distinction between the container of the present embodiment and that of the previous embodiment lies in the difference in arrangement of the grooves on the pre-blow mold and therefore the outwardly directed bulbous projections on the pre-form 90. As can best be viewed in FIG. 14, the external ribbing in this embodiment does not extend entirely around the circumference of pre-form 90. Due to the differential stretching, the major side walls of the container 104 are formed from a minor portion of the pre-form. Thus, a majority of the material in the region of the ribbed portion of the pre-form eventually becomes the container end walls to define not only a structural reinforcement but a material reinforcement as well. The specific internal ribbing structure is illustrated in FIGS. 13-15 as consisting of circumferential ribs 106 and longitudinal ribs 108 to provide an article having a smooth outer wall surface yet having an enhanced strength characteristics.

From the foregoing detailed description of FIGS. 1-16, it will be readily appreciated that the present invention provides a novel method for the manufacture of plastic bottles having an internal reinforcement structure to enable the use of less plastic material. Other specific advantages have been previously discussed and any other advantages can be readily appreciate from those who are skilled in the art.

It should be realized that the present embodiments are merely exemplary of the overall invention propossed by the present application and are not meant to be limiting in any sense.

Having fully and completely disclosed and described my present invention, I Claim:

1. A container of thermosplastic material comprising a finish at one end, a peripheral wall, and a bottom wall each having a substantially smooth outer configuration, a plurality of integral, closely spaced localized reinforcing plastic ribs on the interior surface only of at least one of said walls, and intermediate wall portions between each pair of said closely spaced internal ribs, the thickness of said integral ribs being greater than the thickness of the intermediate wall portions between adjacent, closely spaced ribs, and the intermediate wall portions between each pair of said closely spaced ribs being thicker than other non-ribbed portions of the container wall.

2. The container as defined in claim 1, characterized by said reinforcing ribs being circumferentially positioned on the interior of said wall surface.

3. The container as defined in claim 2, characterized by said reinforcing ribs being inthe heel region of said container.

4. The container as defined in claim 2, characterized by said reinforcing ribs extending around less than the entire periphery of said interior container surface.

5. The container as defined in claim 4, further including a plurality of longitudinally oriented reinforcing ribs.

6. A container of thermoplastic material comprising a finish at one end, a peripheral wall, and a bottom wall, each having a substantially smoother outer configuration, a plurality of integral, closely spaced localized reinforcing plastic ribs on the interior surface only of at least one of said walls, the thickness of said integral ribs being greater than the thickness of the wall portions between adjacent, closely spaced ribs, and the wall portions between said closely spaced ribs being thicker than other non-ribbed portions of the container wall, said internal ribs being formed from outwardly protruding, external bulbous ribs previously existing in a blowable preform, the wall portions between said internal reinforcing ribs being formed from the protruding portion of said bulbous ribs and the internal ribs being formed from the heel portion of the bulbous external ribs.

* * * * *

UNITED STATES PATENT AND TRADEMARK OFFICE
CERTIFICATE OF CORRECTION

PATENT NO. : 4,024,975
DATED : May 24, 1977
INVENTOR(S) : Albert R. Uhlig

It is certified that error appears in the above-identified patent and that said Letters Patent are hereby corrected as shown below:

Column 3, line 39 change "for" to -- from --.

Column 7, line 12 change "positione" to -- positioned --

Column 7, lines 23 & 24 delete "with the embodiment" second occurrence.

Column 8, line 13 change "propossed" to -- proposed --.

Signed and Sealed this twenty-third Day of August 1977

[SEAL]

Attest:

RUTH C. MASON
Attesting Officer

C. MARSHALL DANN
Commissioner of Patents and Trademarks